Figure 1:
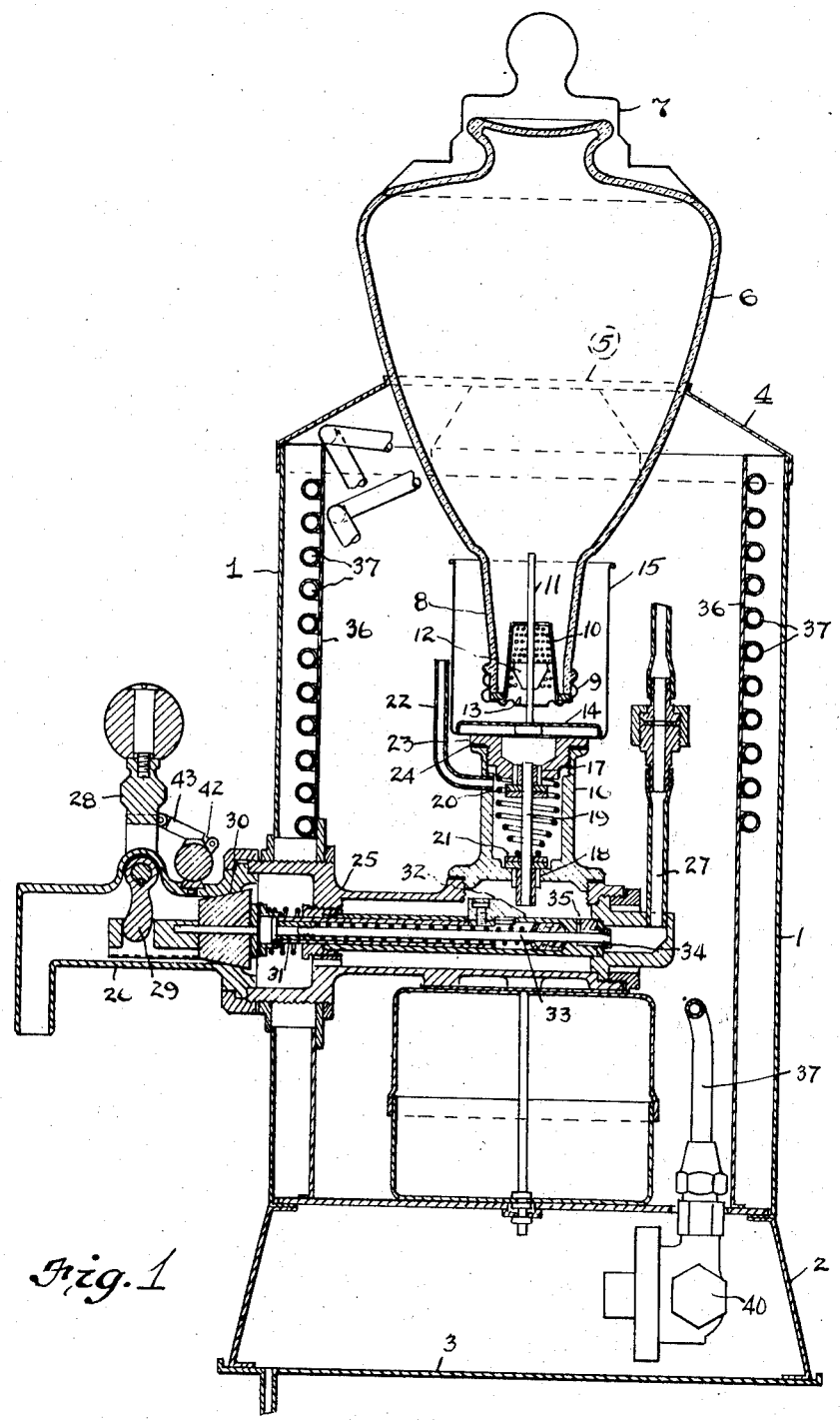

Dec. 4, 1934.  H. J. McCUE  1,982,750
DISPENSING APPARATUS
Filed Dec. 1, 1931  2 Sheets-Sheet 1

INVENTOR.
Harry J. McCue.
BY
Fay, Oberlin + Fay
ATTORNEYS.

Dec. 4, 1934.　　　　H. J. McCUE　　　　1,982,750
DISPENSING APPARATUS
Filed Dec. 1, 1931　　　2 Sheets-Sheet 2

INVENTOR.
Harry J. McCue
BY
Fay, Oberlin & Fay
ATTORNEYS

Patented Dec. 4, 1934

1,982,750

UNITED STATES PATENT OFFICE 1,982,750

DISPENSING APPARATUS

Harry J. McCue, Cleveland, Ohio

Application December 1, 1931, Serial No. 578,259

9 Claims. (Cl. 225—21)

The present invention relating generally as nominally indicated, to a dispensing apparatus, has more particular reference to a device for automatically refrigerating, measuring, and mixing syrup and carbonated and plain water beverages.

One of the objects of my present invention is to provide means for thoroughly admixing the constituents of the carbonated beverages within an interior mixing chamber and before the passage through the dispensing faucet or draft arm. This admixture of the ingredients is accomplished without loss of refrigeration or carbonation and the ready-for-use beverage is delivered after the carbonated water has been thoroughly mixed in the presence of its dissolved carbon dioxide gas, producing a decided improvement in the flavor, texture and taste of the beverage as well as substantially eliminating waste of the syrup and carbon dioxide gas. Means are also provided for the control of the foam. It is a well known fact that when carbon dioxide gas is introduced into water in which sugar is dissolved in a closed tank that the resultant mixture is in the form of a frothy or foamy substance and must be reduced to liquefied form through the release of some of the carbon dioxide gas before a substantially liquid beverage may be produced. In some cases, however, the foamy or frothy substance is served as a beverage in its original form, such as foamy root beer. Such above mentioned alternative forms of beverages may be conveniently reduced in my dispensing apparatus through the regulation of the form of inlet water jet which shall be hereinafter more fully described and set forth.

It is a further object to provide a cooling system and housing assembly for my device whereby there shall be maintained a satisfactory cooling temperature upon the liquids contained in the interior of the dispensing device while, at the same time producing a sufficiently low temperature upon the exterior of the housing as to cause the exposed surface and parts thereof to become covered with frost. The last-named expedient has the particular advantage of enhancing the attractiveness of the dispensing apparatus for display purposes.

Another object is the provision of means for predeterminately measuring the amount of syrup which is introduced into the mixing chamber, and which is ultimately communicated to each individual drink dispensed by the apparatus.

Still another object is to provide means for recording the number of times that the draft arm is operated, and consequently the number of drinks dispensed by the apparatus.

Advantages and objects additional to those above enumerated shall become apparent as the following description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
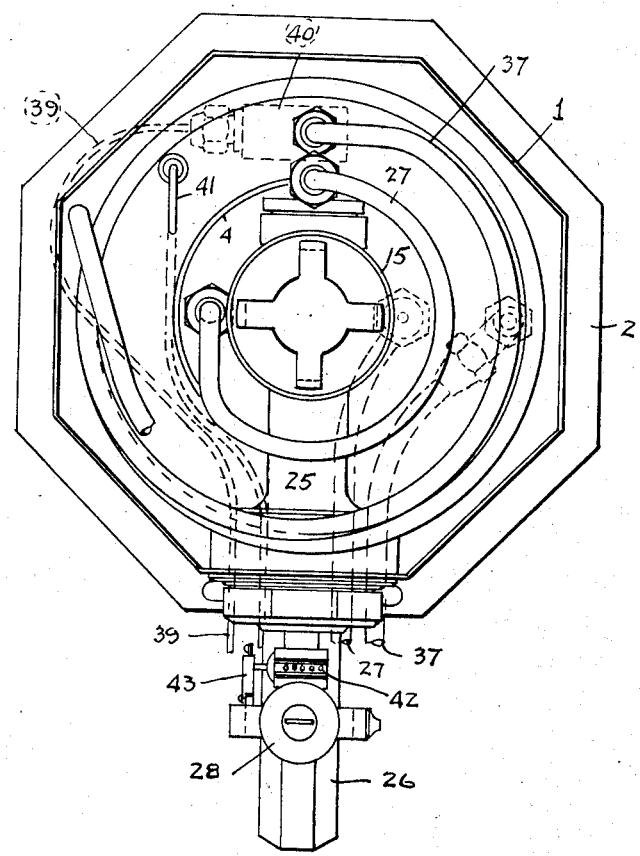

In said annexed drawings:

Fig. 1 is a sectional elevation of the dispensing apparatus constructed according to the principle of my invention; Fig. 2 is a plan view of the apparatus illustrated in Fig. 1 with the syrup bottle and cover removed.

Directing attention more particularly to Fig. 1, there is shown the outer housing assembly shell 1 mounted upon the supporting base 2. The outer shell 1, although shown to be of octagonal shape, may be made cylindrical or in any other equivalent cross-sectional form which the mandates of attractive design may prescribe. A rubber mat 3 may be placed under the supporting base 2. A top 4 fits over the housing shell 1 and has a center opening 5 for the reception of the syrup bottle 6. A false polished metallic bottle cover 7 rests upon the top of the syrup bottle or globe 6.

The lower or inserted end of the syrup globe 6 is elongated into the neck portion 8 to which in turn is secured the screw cap 9 carrying the conical syrup strainer 10 and valve stem 11. The valve stem 11 carries the conical valve 12 which is adapted to bear against the seat 13 when the syrup globe 6 is removed from its inserted position upon the dispenser. The last described valve mechanism is for the purpose of preventing the spilling of syrup when the syrup globe 6 is inserted through the opening 5. A valve lifting plate 14 bears against the bottom of the syrup cup 15 and raises the valve 12 to open position when the syrup globe 6 is placed in proper operating position.

It will thus be seen that inasmuch as the syrup globe 6 has no upper opening, that a constant quantity of syrup will be maintained in the syrup cup 15 at all times due to the exertion of barometric pressure.

Immediately below the syrup cup 15 is positioned the measuring chamber 16 having the upper and lower inlet and outlet ports 17 and 18 respectively. A spring loaded valve stem 19 carries the valves 20 and 21 which are in turn adapted to open and close the ports 17 and 18. A vent pipe 22 effects atmospheric communication with the top of the measuring chamber 16, and is for the purpose of enabling the rapid delivery of the syrup from the measuring chamber 16 into the mixing chamber as well as the delivery from the syrup cup 15 to the measuring chamber 16, in a manner which shall be hereinafter more fully described. An annular bushing 23 threadably engages the upper ports of the measuring chamber and supports the bottom of the syrup cup 15. By means of varying the thickness of the washer or gasket 24 between the bushing 23 and the measuring chamber 16, it is possible to adjustably regulate the capacity of the measuring chamber 16.

The bottom of the measuring chamber 16 communicates with the mixing chamber 25 upon one end of which is positioned the draft arm or dispensing faucet 26, and upon the other end of which is attached the plain or carbonated water supply pipe 27.

The draft arm actuating handle 28 moves the interior cam 29 which in turn unseats the rubber plug 30, thereby effecting an opening between the mixing chamber 25 and the draft arm or faucet 26. Attached to the rear of the rubber plug valve 30 and positioned within the interior of the mixing chamber 25 is found the auxiliary tubular valve mechanism 31 which carries the beveled lug 32. The lug 32, upon movement of the draft arm and valve mechanism, forces the measuring chamber valve stem upwards, closing the upper port 17 and opening the lower port 18 so that the contents of the measuring chamber 16 will be delivered to the interior of the mixing chamber 25. On further movement of the draft arm actuating handle 28, the spring mounted water valve stem 33 will be moved to the right or further backward in order to open the water valve 34. When the water valve 34 is open, a spray of water will be delivered upwardly through the jet opening 35 towards the communicating port 18 of the syrup measuring chamber 16. The upwardly delivered jet 35 has the effect of imparting a whirlpool action to the incoming water which produces a thorough admixture with the syrup, as well as washing off the syrup valve parts.

It will thus be seen that the constituents of the dispensed beverage are thoroughly mixed within the interior of the device, with the exclusion of air and consequently without any substantial de-aeration of the carbonated water. Furthermore, both the syrup and the water supply are subjected to a thorough refrigeration action by means of the cooling system which shall now be fully described.

Inwardly spaced from the outer housing shell 1 is found the inner shell 36 about which is coiled the refrigerant circulating pipe 37. Referring to Fig. 2, the compressed refrigerant such as methyl chloride, sulphur dioxide, or the like, is introduced through the high pressure pipe 39 to the expansion valve 40 and is then boiled or evaporated through the circulating coils 37, producing a resultant refrigeration effect.

A non-freezing liquid is contained in the space between the outer metallic shell 1 and the inner shell 36 with the result that there is a more rapid thermo-conductivity towards the exterior of the housing shell 1 than there is towards the interior. By increasing the thermo-conductivity of the surface of the housing shell 1 by means of plating or highly polishing such surface, it is possible to produce a deposit of frost thereon.

Therefore, while the outer surface of the housing shell 1 is maintained at below a freezing temperature of 32° F., the interior parts being separated from the refrigerating coils by a medium of greater thermo-resistance, namely, air, will be maintained at a temperature above freezing or about 36 to 40° F. Referring again to Fig. 2, a thermostat tube 41 communicates with the interior of the dispensing apparatus and maintains a controlled temperature therein.

A mechanical counter 42 may be mounted upon the upper side of the draft arm 26 and connected by means of the link arm 43 to the draft arm actuating lever 28, so that the number of drinks dispensed by the apparatus will be immediately recorded.

It will thus be apparent that the mixing chamber is practically a continuation of the water line, the latter being bellied out at a designated point in order to allow for the measuring chamber attachment, with a water inlet at one end and a water outlet at the other. The draft arm movement initially opens the syrup valve and allows a predetermined amount of syrup to flow into the water line, and then as the rubber plug opens from its seat, the completely mixed beverage flows out through the draft arm.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a beverage dispensing apparatus, the combination of a mixing chamber, a dispensing faucet positioned on the end of said chamber, an operating valve for said faucet, a syrup reservoir, an auxiliary chamber connecting said reservoir to said mixing chamber, valve means for delivering the contents of said auxiliary chamber to said mixing chamber, and means for actuating said valve means connected to and operated by said faucet valve.

2. In a beverage dispensing apparatus, the combination of a mixing chamber, a dispensing faucet positioned on the end of said chamber, a syrup reservoir, an auxiliary chamber connecting said reservoir to said mixing chamber, valve means for delivering the contents of said auxiliary chamber to said mixing chamber, and a plain or carbonated water inlet in the end of said mixing chamber opposite said faucet, said inlet being adapted to direct a spray of water into the interior of said mixing chamber and against said auxiliary valve.

3. In a beverage dispensing apparatus, the combination of a mixing chamber, a dispensing faucet positioned on the end of said chamber, an operating valve for said faucet, a syrup reservoir, an auxiliary chamber connecting said reservoir to said mixing chamber, valve means for delivering the contents of said auxiliary chamber to said mixing chamber, a plain or carbonated water inlet in the end of said mixing chamber opposite said faucet, and valve means for opening and closing said inlet upon the actuation of said faucet valve.

4. In a beverage dispensing apparatus, the combination of a mixing chamber, a dispensing faucet positioned on the end of said chamber, a syrup reservoir, a syrup measuring chamber connecting said reservoir to said mixing chamber, valve means for simultaneously disconnecting said syrup reservoir in said auxiliary chamber and for delivering the contents of the latter to said mixing chamber, a plain or carbonated water inlet in the end of said mixing chamber opposite said faucet, valve means for opening and closing said inlet upon the actuation of said faucet and refrigerating means surrounding all of said above-named elements with the exception of said faucet.

5. In a beverage dispensing apparatus, the combination of an outer metallic shell, an inner shell spaced from said outer shell, and refrigerating means for producing a coating of frost on said outer shell.

6. In a beverage dispensing apparatus, the combination of an outer metallic shell, an inner shell spaced from said outer shell, a low freezing point solution contained in the space between said shells, and means for refrigerating said solution.

7. In a beverage dispensing apparatus, the combination of an outer metallic shell, an inner shell spaced from said outer shell, a low freezing point solution contained in the space between said shells, and refrigerant circulating coils passing through said solution.

8. In a beverage dispensing apparatus, the combination of a mixing chamber, a syrup inlet, a plain or carbonated water inlet, both of said inlets communicating with said mixing chamber, a dispensing faucet connected to said mixing chamber, valve means normally closing said mixing chamber to the atmosphere and normally closing said inlets, and means for actuating said valve means whereby said syrup inlet is opened before said mixing chamber is opened to said faucet.

9. In a beverage dispensing apparatus, the combination of an outer metallic housing, an inner shell spaced from said outer housing, beverage circulating means positioned within the interior of said inner shell and refrigerating means positioned between said shell and said housing for producing a coating of frost on the exterior of said housing and for refrigerating said beverage circulating means.

HARRY J. McCUE.